United States Patent
Bauche-Costes et al.

(10) Patent No.: US 11,592,514 B2
(45) Date of Patent: Feb. 28, 2023

(54) AMPLITUDE GONIOMETER AND ASSOCIATED PLATFORM

(71) Applicant: THALES, Courbevoie (FR)

(72) Inventors: Clémentine Bauche-Costes, Brest (FR); Daniel Jahan, Brest (FR); Nicolas Breuil, Élancourt (FR); Vincent Guardia, Brest (FR)

(73) Assignee: THALES, Courbevoie (FR)

( * ) Notice: Subject to any disclaimer, the term of this patent is extended or adjusted under 35 U.S.C. 154(b) by 311 days.

(21) Appl. No.: 16/763,151

(22) PCT Filed: Nov. 16, 2018

(86) PCT No.: PCT/EP2018/081501
§ 371 (c)(1),
(2) Date: May 11, 2020

(87) PCT Pub. No.: WO2019/096966
PCT Pub. Date: May 23, 2019

(65) Prior Publication Data
US 2020/0400771 A1    Dec. 24, 2020

(30) Foreign Application Priority Data
Nov. 16, 2017    (FR) ...................................... 17 01184

(51) Int. Cl.
*G01S 5/04* (2006.01)
*G01S 3/18* (2006.01)
(Continued)

(52) U.S. Cl.
CPC .............. *G01S 3/18* (2013.01); *G01S 3/043* (2013.01); *G01S 3/14* (2013.01); *G01S 3/28* (2013.01); *G01S 3/46* (2013.01); *G01S 7/021* (2013.01)

(58) Field of Classification Search
CPC ... G01S 3/14; G01S 3/18; G01S 3/043; G01S 3/28; G01S 7/021
(Continued)

(56) References Cited

U.S. PATENT DOCUMENTS

| 8,718,674 | B2 * | 5/2014 | Germond ............... G01S 5/0218 455/456.6 |
| 9,052,379 | B2 * | 6/2015 | Jahan ....................... G01S 3/043 |
| 2005/0035894 | A1 | 2/2005 | Dean et al. |

FOREIGN PATENT DOCUMENTS

| EP | 3671250 A1 * | 6/2020 | ............. G01S 3/043 |
| EP | 3672088 A1 * | 6/2020 | ............... H04B 1/12 |

(Continued)

*Primary Examiner* — Chuong P Nguyen
(74) *Attorney, Agent, or Firm* — ArentFox Schiff LLP

(57) ABSTRACT

The present invention relates to an amplitude goniometer comprises P receiver channels, P being greater than or equal to 2, each receiver channel being identified by an index p, each receiver channel comprising an antenna coupled to a receiver chain followed by at least two digital receiver modules each comprising an analogue-to-digital conversion module associated with a respective sampling frequency, each sampling frequency not complying with the Shannon criterion and not being a multiple of another frequency, N being the number of frequencies, N being greater than or equal to 2, each frequency being referenced by an index n, the amplitude goniometry estimator working from the amplitudes of the signals originating from at least Q adjacent receiver channels of the P receiver channels, Q being at most equal to P, the sampling frequencies being associated with the analogue-to-digital conversion modules of the Q adjacent receiver channels.

12 Claims, 5 Drawing Sheets

(51) Int. Cl.
*G01S 3/04* (2006.01)
*G01S 3/46* (2006.01)
*G01S 7/02* (2006.01)
*G01S 3/14* (2006.01)
*G01S 3/28* (2006.01)

(58) Field of Classification Search
USPC ................................................ 342/440, 441
See application file for complete search history.

(56) References Cited

FOREIGN PATENT DOCUMENTS

| EP | 3971599 A1 * | 3/2022 | ............... G01S 3/04 |
| FR | 3 028 320 A1 | 5/2016 | |
| FR | 3073627 B1 * | 2/2020 | ............. G01S 3/043 |
| FR | 3114165 A1 * | 3/2022 | ............. G01S 3/043 |
| WO | WO 2016/186998 A1 | 11/2016 | |

* cited by examiner

AMPLITUDE GONIOMETER AND ASSOCIATED PLATFORM

CROSS-REFERENCE TO RELATED APPLICATIONS

This application is a National Stage Entry of International Patent Application No. PCT/EP2018/081501, filed on Nov. 16, 2018, which claims priority to French Application No. 17 01184, filed on Nov. 16, 2017. The disclosures of the priority applications are incorporated in their entirety herein by reference.

TECHNICAL FIELD OF THE INVENTION

The present invention relates to an amplitude goniometer and a platform including such an amplitude goniometer.

TECHNOLOGICAL BACKGROUND

In the field of radar detectors, instantaneous wide-band receivers are commonly used due to a very high frequency range to be monitored and the uncertainty as to the frequency of the incident signal at a given moment. These radar detectors are also commonly instantaneous goniometers capable of delivering the direction of arrival of an incident radar signal, even limited to a single very short pulse.

The principles of instantaneous goniometry are always based on the use of a set of P antennas, a priori identical, P being at least equal to 2, able to simultaneously deliver a set of electrical signals, globally carrying the direction of arrival of the incident radio signal.

In general, each antenna is followed by a receiver chain able to amplify and filter the signal that it provides, the P signals delivered by the P receiver chains making it possible to estimate the direction of arrival.

A distinction should be made between the two goniometry cases conventionally used: amplitude goniometers and interferometers. All of these goniometers generally use identical antennas with appropriate directivity.

The antennas of an amplitude goniometer are angularly pointed in an offset manner from one another in the measuring plane of the angle of arrival of an incident signal, such that their directivity causes them to deliver a set of signals whose powers are representative of this angle of arrival.

The antennas of an interferometer are angularly pointed in the same direction while being spatially offset from one another in the measuring plane of the angle of arrival of an incident signal, such that they deliver a set of signals whose relative phases are representative of this angle of arrival.

The spectral bandwidth of the frequency bands of interest requires having a frequency separating power, which is very generally done by spectral analysis, and in light of the available components, done more particularly by digital spectral analysis based on the use of discrete Fourier transforms (DFT) done by fast Fourier transforms (FFT). Thus a receiver chain, which is the analog part, is generally followed by a digital reception module comprising an analog-digital conversion module, using a sampler-blocker and an analog-digital converter working with a sampling frequency $f_e$, which in turn is followed by a digital processing module of the signal performing the desired DFT.

In light of the very high instantaneous band, typically on the order of at least 16 GHz, no reasonably usable analog-digital conversion components exist at this time that are capable of complying with the Shannon theorem. Additionally, complying with it would result in digital data streams, typically on the order of 40 Gbit/s, the conveying of which by bus would pose very serious feasibility problems and is absolutely not compatible with the processing capabilities of the current FPGAs (Field Gate Programmable Arrays) used to produce the digital processing modules of the signal.

One known solution is to digitize the signal with a sampling frequency not complying with the Shannon theorem, thus the sampling half-frequency $$\frac{f_e}{2}$$

is less than the frequency band of interest; this is referred to as under-sampling. The consequence is the noncompliance with the spectral integrity and that the measured frequency, comprised between 0 and the sampling half-frequency $$\frac{f_e}{2},$$

is ambiguous, which requires the use of several different sampling frequencies $f_{e,n}$ that are not multiples of one another. It will strictly be noted that, in order to comply with the spectral integrity, the Shannon theorem is a necessary, but insufficient condition. Indeed, compliance with the spectral integrity is related to the placement of the frequency band of interest in a single Nyquist zone; it will be recalled that a sampling frequency $f_e$ defines the Nyquist zones as the frequency bands $$\left[l\frac{f_e}{2}, (l+1)\frac{f_e}{2}\right[.$$

Document WO 2010/069683 A1 discloses a sampling of the signal with N slightly different frequencies that are not multiples of one another, a measurement of an ambiguous frequency for each sampling frequency, and the extraction of an unambiguous frequency from these N ambiguous frequencies.

The direct application to a goniometer with P antennas therefore leads to arranging, at the output of each of the P receiver chains following each of the P antennas, N digital receiver modules in parallel, each digital receiver module being made up of an analog-digital conversion module, working with one of the N different sampling frequencies that is dedicated to it, and a digital processing module of the signal. Lastly, said goniometer with P antennas has P·N digital receiver modules.

This number P·N of digital receiver modules can quickly become prohibitive for applications for cost reasons, as well as volume, mass, consumption, heat dissipation and reliability reasons. It is therefore desirable to minimize this number of digital receiver modules.

Document WO 2004/097450 addresses this problem by using a single digital receiver module at the output of the receiver chain, each digital receiver module having a different sampling frequency, and not using the signal of the channel for which the frequency of the signal is equal or very close to the sampling half-frequency or one of its multiples. In this case, the goniometer that has P antennas only uses P−1 of them, which degrades the performance.

BRIEF DESCRIPTION OF THE INVENTION

There is therefore a need for a goniometer making it possible to minimize the quantity of equipment with a given measuring precision and robustness, the quantity of equipment acting directly on the cost, volume, mass, consumption, heat dissipation and reliability aspects.

Starting from this need, the applicant has proposed to find a solution to substantially decrease the number of digital receiver modules.

In the case of an interferometer, the technical problem becomes that of a distribution of the N sampling frequencies over the P receiver chains while taking account of the first and second elements that will follow.

In the case of an amplitude goniometer, the technical problem becomes that of a distribution of the N sampling frequencies over the Q adjacent receiver chains, Q being at most equal to P, while taking account of the first, second, third and fourth elements that will follow.

The first element to be taken into account is that a frequency signal f that is a multiple of the sampling half-frequency, $$f = k\frac{f_e}{2}$$

with k a non-nil natural integer, cannot be characterized in amplitude, or in phase.

Indeed, a sinusoidal frequency signal f, sampled at the frequency $f_e$, has for expression $$s(n) = A\cos\left(2\pi f\frac{n}{f_e} + \varphi\right). \text{ If } f = k\frac{f_e}{2},$$

then:

$$s(n) = A\cos(\pi kn + \varphi) = A[\cos(\pi kn)\cos(\varphi) - \sin(\pi kn)\sin(\varphi)] = A\cos(\pi kn)\cos(\varphi)$$

The spectral analysis by DFT makes it possible, in general, to calculate the amplitude and the phase of the signal. In the case where $$f = k\frac{f_e}{2},$$

the signal folds, either in f=0 if k is even, or in $$f = \frac{f_e}{2}$$

it k is odd. The result is therefore, for an even k:

$$DFT\{s\}(f=0) = A\sum_{n=0}^{N-1}\cos(\pi kn)\cos(\varphi)e^0 = A\sum_{n=0}^{N-1}\cos(\varphi) = NA\cos(\varphi)$$

and for an odd k:

$$DFT\{s\}\left(f=\frac{f_e}{2}\right) = A\sum_{n=0}^{N-1}\cos(\pi kn)\cos(\varphi)e^{-i\pi n} =$$

$$A\sum_{n=0}^{N-1}\cos(\pi kn)\cos(\varphi)\cos(\pi n) = A\sum_{n=0}^{N-1}\cos(\varphi) = NA\cos(\varphi)$$

The result at the signal frequencies that are multiples of the sampling half-frequency is a real number proportional to $\cos(\varphi)$. Real, it cannot carry any phase. Its proportionality to $\cos(\varphi)$, whereas $\varphi$ is a phase that is not controlled in the beginning, does not make it possible to deduce the amplitude thereof. It therefore no longer makes it possible to estimate the direction of arrival of the signal by interferometry, or by amplitude goniometry. In general, taking this element into account leads to having at least 2 different sampling frequencies by receiver channels in order to ensure at least one phase measurement or amplitude measurement.

The second element to be taken into account in the case of an interferometer [is] that the direction of arrival estimate is based on a calculation of the phase shifts between antennas. The phase conventionally measured after DFT is the sum of:

the phase of the signal delivered by the considered antenna;

a term depending on the gap between the frequency of the signal measured in the Nyquist zone used and the central frequency of the filter of the DFT;

a term due to the thermal noise of the receiver chain.

In other words, ultimately:

$$\varphi_{mes} = \varphi_{signal} + \varphi_{DFT} + \varphi_{Bth}$$

The property of interest is not directly the phase of the signal originating from an antenna, but the phase between the signals originating from two antennas perceiving a same incident signal. Thus, the term $\varphi_{DFT}$ can naturally be canceled out by subtraction as long as the analysis durations of the DFTs are identical in order to ensure identical DFT filter central frequencies. It is indeed always this way for interferometers working with a single sampling frequency.

For a sampling frequency $f_{e,n}$, the number of samples with signal $M_n$ corresponding to a duration $\Delta T_n$ is equal to $M_n = \Delta T_n \cdot f_{e,n}$.

If one wishes to calculate phase differences between two signals sampled at different frequencies $f_{e,n}$, one may thus calculate the DFTs:

either over an identical analysis duration $\Delta T_n = \Delta T$, their number of points $M_n$ is then not identical because $$\frac{f_{e,n}}{M_n} = \Delta T,$$

and a single value or $M_n$ can be a power of 2 and a single DFT will be able to be done by an FFT, with a computing resource cost as final result;

or over a single number of points M, increasing by the numbers $M_n$, for example $$\max_{n \in [1,N]} (M_n),$$

and equal to a power of 2, so as to take advantage of a performance by FFT. In this case, however, the analysis durations of the DFTs are not identical, the DFT filter central frequencies of each DFT are not identical, and therefore the gap between the measured frequency and the center of the corresponding DFT filter is not identical from one DFT to the next. It is then necessary to compensate the term $\varphi_{DFT}$ by calculation, which requires a precise estimate of the frequency of the signal.

It should be noted that the problem also arises for amplitude goniometry, since the amplitude measurement also depends on the placement of the frequency of the signal in the DFT filter. However, the error induced in the measurement of the amplitude is relatively small, and its correction does not require great precision in the estimate of the frequency of the signal, particularly since this error is minimized by the weighting of the signal generally used, which broadens the bandwidth of the DFT filter.

The third element to be taken into account is the instantaneous angular coverage of an amplitude goniometer. Indeed, this is generally 360°, because it is unknown where the incident signals may come from in the horizontal plane, and great reactivity is necessary. An instantaneous angular coverage of less than 360° is, however, conceivable in less demanding scenarios, which may accept such a reduced instantaneous coverage that may be stationary, or adjustable so as to be able to scan a greater angular area, which may reach 360° if needed, but not instantaneously. In amplitude goniometry, the antennas may be referenced by the index p ranging from 0 to P−1, the value of p corresponding to a given angular order (values crossing in the trigonometric direction or in the opposite direction, in the measuring plane of the direction of arrival, the reference p=0 being able to be any reference). All of the components related to an antenna (receiver channel, receiver chain, digital receiver module) have its index. Hereinafter, a receiver channel refers to the hardware assembly that makes it possible to acquire the physical property of interest in order to estimate the direction of arrival. The third element to be taken into account is knowing whether the instantaneous angular coverage is less than or equal to 360°, because the case of a quality to 360° raises a problem of distribution of the sampling frequencies at the transition between the last receiver channel with index P−1 and the first receiver channel with index 0.

The fourth element to be taken into account is that the estimate of the direction of arrival by amplitude goniometry is done with a minimum number of adjacent receiver channels Q, detecting the signal and delivering an amplitude, among the P in all. Q adjacent receiver channels must be understood as a set of Q receiver channels having successive indexes. The distinction on the angular coverage previously made affects the meaning of the term successive indexes. If the angular coverage is less than 360°, the series is bounded by the extreme indexes 0 and P−1. If, however, the angular coverage is equal to 360°, the series is no longer bounded by the extreme indexes, but is based on the circular continuity, 0 following P−1.

From a theoretical point of view, Q may be between 1 and P, and Q is greater the more angular precision is desired. In practice, it will generally be allowed that Q is equal to at least 2, so as to be able to perform an estimate based, in one manner or another, on the weight of the pointing directions of the antennas related to the receiver channels detecting the signal by the corresponding amplitudes. The value Q=1 is mentioned because it is strictly possible. However, it results in a rudimentary estimate of the direction of arrival without calculation, since it can only correspond to the pointing direction of the concerned antenna. Additionally, the constraint of eliminating frequency ambiguity in this case requires having N sampling frequencies for each of the P receiver channels, which goes against the desired reduction in the total number of digital receiver modules.

Due to the elements to be taken into account to obtain an interferometer optimizing the quantity of digital receiver modules with a given performance, the present disclosure relates to an interferometer comprising an interferometric array with P receiver channels, P being an integer greater than or equal to 2, each receiver channel being identified by an index p, the index p being an integer between 0 and P−1, each receiver channel including an antenna coupled to a receiver chain, each receiver chain being followed by at least two digital receiver modules each comprising an analog-digital conversion module, each analog-digital conversion module being associated with a respective sampling frequency, each sampling frequency not complying with the Shannon criterion and not being a multiple of one of the other sampling frequencies, N being the number of sampling frequencies associated with the analog-digital conversion modules belonging to the P receiver channels, N being greater than or equal to 2, each sampling frequency being referenced by an index n, the index n being between 0 and N−1, a pair of sampling frequencies with indexes n·mod(N) and (n+1)·mod(N) being able to be associated with a pair of analog-digital conversion modules of a same receiver channel.

According to specific embodiments, the interferometer has one or more of the following features, considered alone or according to any technically possible combinations:

- each receiver channel with index p, ranging from 0 to P−1, has only one pair of analog-digital conversion modules.
- the number of sampling frequencies N is equal to the number of receiver channels P, and the pair of analog-digital conversion modules of the receiver channel with index p is associated with the pair of sampling frequencies with indexes p·mod(N) and (p+1)·mod(N).
- the number of sampling frequencies N is less than the number of receiver channels P, and the pair of sampling frequencies with indexes n·mod(N) and (n+1)·mod(N) is associated with the pair of analog-digital conversion modules of the receiver channel with index n, the analog-digital conversion modules of the P N other receiver channels being associated with any pair of sampling frequencies with indexes n·mod(N) and (n+1)·mod(N).
- the number of sampling frequencies N is greater than the number of receiver channels P, and each receiver channel with index p ranging from 0 to P−1 has a pair of analog-digital conversion modules associated with a pair of sampling frequencies with indexes p·mod(P) and (p+1)·mod(P).
- the N−P sampling frequencies not belonging to the pairs of indexes p mod(P) and (p+1)·mod(P) are respectively associated with analog-digital conversion modules of the N−P additional digital receiver modules, these additional digital receiver modules being assigned in any manner to this set of P receiver channels.
- the interferometer includes a computer able to process the signals coming from the digital receiver modules.
- each analog-digital conversion module is connected to a digital processing module of the signal able to perform a spectral analysis of the sampled signals.
- the spectral analysis is done by discrete Fourier transform associated with a weighting of the sampled signals upstream.

Similarly, in order to obtain an amplitude goniometer, the present disclosure relates to an amplitude goniometer comprising P receiver channels, P being an integer greater than or equal to 2, each receiver channel being identified by an index p corresponding to a given angular order, the index p being an integer between 0 and P−1, each receiver channel including an antenna coupled to a receiver chain, each receiver chain being followed by at least two digital receiver modules each comprising an analog-digital conversion module, each analog-digital conversion module being associated with a respective sampling frequency, each sampling frequency not complying with the Shannon criterion and not being a multiple of one of the other sampling frequencies, N being the number of sampling frequencies associated with the analog-digital conversion modules belonging to the P receiver channels, N being greater than or equal to 2, the index n being between n and 0, the amplitude goniometry estimator working from amplitudes of the signals originating from at least N−1 adjacent receiver channels among the Q receiver channels, P being at most equal to Q, the sampling frequencies being associated with the analog-digital conversion modules of these P adjacent receiver channels.

According to specific embodiments, the amplitude goniometer has one or more of the following features, considered alone or according to any technically possible combinations:
- the N sampling frequencies are divided into J sampling frequency groups, each group comprising at least 2 different sampling frequencies, with J being minimal and most equal to Q.
- the analog-digital conversion modules of a receiver channel with index p are associated with the group of sampling frequencies $G_{p \cdot mod(j)}$, for p ranging from 0 to P−1.
- the angular coverage is less than 360°.
- the angular coverage is equal to 360° and P is greater than or equal to 3.
- P is a multiple of J or is equal to Q.
- P is not a multiple of J, or equal to Q, and wherein the sampling frequencies of the groups $G_R$ to $G_{J-1}$ are respectively associated with analog-digital conversion modules of complementary digital receiver modules, these complementary digital receiver modules being assigned in any manner to the set of two receiver channels $V_0$ and $V_{P-1}$, and R being the remainder of the Euclidean division of P by J.
- the minimum number of adjacent receiver channels required by the estimate of the direction of arrival is equal to 2.
- the goniometer includes a computer able to process the signals coming from the digital receiver module.
- each analog-digital conversion system is connected to a digital processing module of the signal able to perform a spectral analysis of the sampled signals.
- the spectral analysis is done by discrete Fourier transform associated with a weighting of the sampled signals upstream.

The present disclosure also proposes a platform including an interferometer or an amplitude goniometer taking account of the constraints previously disclosed and leading to the embodiments that follow.

BRIEF DESCRIPTION OF THE DRAWINGS

Features and advantages of the invention will appear more clearly upon reading the following description, provided solely as a non-limiting example, and done in reference to the appended drawings, in which.

DETAILED DESCRIPTION OF THE INVENTION

Figure 1:
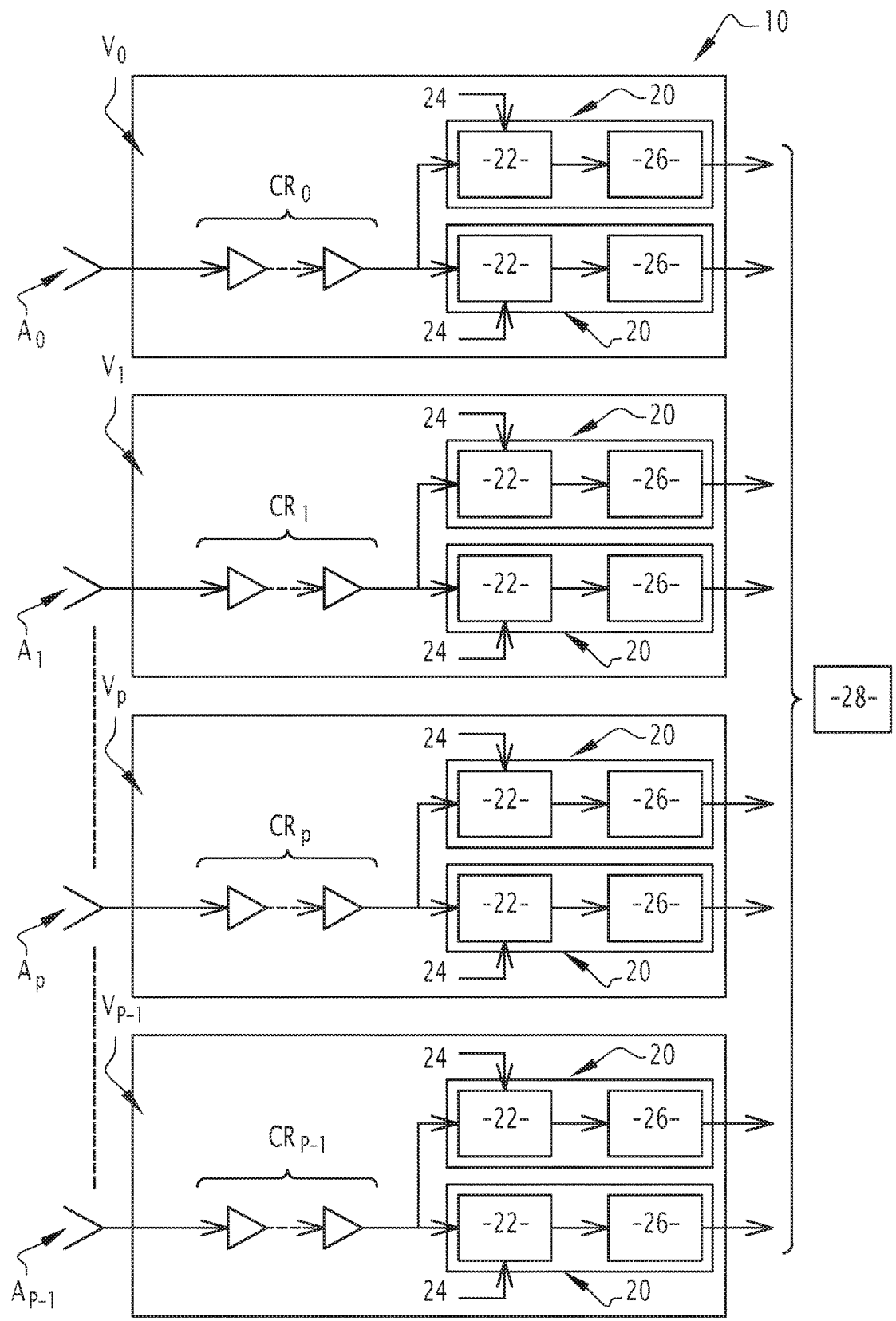
FIG. 1 is a schematic view of an interferometer including a computer.

FIG. 1 illustrates an interferometer 10 using P antennas, P being an integer greater than or equal to 2.

The interferometer 10 is part of a platform, the platform for example being an aircraft.

Each antenna is identified by an index p, corresponding to an integer between 0 and P−1.

Each antenna $A_0, \ldots, A_{P-1}$ delivers its output signal to the input of a receiver chain $CR_0, \ldots, CR_{P-1}$, representing the purely analog part.

Each receiver chain $CR_0, \ldots, CR_{P-1}$ delivers its output signal, filtered and brought to a usable power, to at least two digital receiver modules 20 each including an analog-digital conversion module 22 followed by a digital processing module of the signal 26.

Each analog-digital conversion module 22 is able to perform sampling at a sampling frequency 24.

Hereinafter, an analog-digital conversion module 22 is associated with a sampling frequency 24 when the analog-digital conversion module 22 is able to perform sampling at the sampling frequency 24.

The frequency band at the input of the analog-digital conversion module 22 is not contained in a single Nyquist zone defined by the sampling frequency 24.

The digital processing module of the signal 26 performs a DFT of the digital signal supplied by the analog-digital conversion module 22, very generally after having performed weighting of this signal over the desired analysis duration, this weighting essentially seeking to minimize the secondary spectral lobes for the dynamic of the frequency-separating power.

The interferometer 10 also includes a computer 28 collecting the useful outputs of the DFTs of the various digital processing modules of the signal 26 and able to obtain the direction of arrival of the incident signal illuminating the set of antennas $A_1, \ldots, A_P$.

The antennas $A_0, \ldots, A_{P-1}$ can be directional. If this is the case, they are generally pointed along a single axis orthogonal to the alignment line of their phase center. The distance distribution of the antennas $A_0, \ldots, A_{P-1}$ is defined to ensure specified characteristics of angular precision and angular ambiguity rates.

The distribution of the sampling frequencies over the analog-digital conversion modules 22 is chosen to minimize the quantity of digital receiver modules 20 each made up of analog-digital conversion modules 22 and processing modules 26 while fully using the possible performance related to the antenna arrange $A_0, \ldots, A_P$ of the interferometer 10.

Several specific cases of interferometers 10 are illustrated in reference to FIGS. 2 to 5.

In these figures, each receiver channel is shown simply in the form of an antenna and each analog-digital conversion module is shown schematically by a rectangle in which the sampling frequency used by said module is shown.

Figure 2:
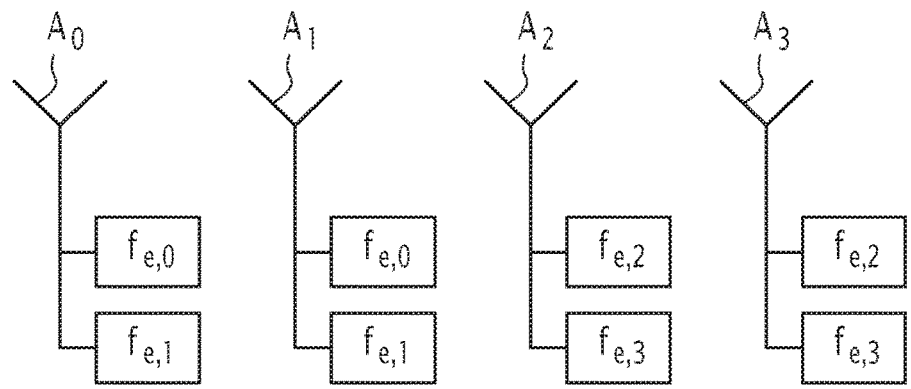
FIG. 2 is a schematic illustration of an exemplary interferometer.

FIG. 2 illustrates a case where the number of receiver channels P is equal to the number of sampling frequencies N, in the case at hand P=N=4.

Each receiver channel has only two analog-digital conversion modules.

The analog-digital conversion modules of the receiver channel indexed 0 are respectively associated with the sampling frequency indexed 0, $f_{e,0}$, and with the sampling frequency indexed 1, $f_{e,1}$. The analog-digital conversion modules of the receiver channel indexed 1 are respectively associated with the sampling frequency indexed 0, $f_{e,0}$, and with the sampling frequency indexed 1, $f_{e,1}$. The analog-digital conversion modules of the receiver channel indexed 2 are respectively associated with the sampling frequency indexed 2, $f_{e,2}$, and with the sampling frequency indexed 3, $f_{e,3}$. The analog-digital conversion modules of the receiver channel indexed 3 are respectively associated with the sampling frequency indexed 2, $f_{e,2}$, and with the sampling frequency indexed 3, $f_{e,3}$.

Thus, no frequency of the band of interest is located near multiples of the sampling half-frequency, simultaneously for the two sampling frequencies associated with a same receiver chain; or, in the example illustrated above, for $f_{e,0}$ and $f_{e,1}$ simultaneously, or for $f_{e,2}$ and $f_{e,3}$ simultaneously.

We have thus taken account of the first element mentioned in the section titled Brief description of the invention, namely that a phase measurement is systematically available on each antenna, even if the frequency of the signal is close to k $f_{e,n}/2$ for one of the sampling frequencies $f_{e,n}$. Furthermore, in the general case where the measurements done using the two digital receiver modules of a same receiver channel are usable, it is possible to take advantage of this redundant information to improve the measuring precision.

A distribution of the sampling frequencies like that illustrated by FIG. 2 requires using computation to compensate the phase term $\varphi_{DFT}$, or to adapt the number of points of the spectral analysis, with the drawbacks accompanying the description of the second element to be taken into account.

Such an interferometer case (P=N) also makes it possible to compensate for this term by a suitable distribution of the sampling frequencies by noting that P receiver channels only deliver P−1 phase shifts between independent antennas, and that they make it possible to form P different sets of P−1 independent phase shifts. Thus, a suitable distribution of the sampling frequencies is such that each of the P different sets of P−1 independent phase shifts exclusively uses one of the N=P groups of N−1=P−1 possible sampling frequencies. Furthermore, the compensation of the phase term $\varphi_{DFT}$ related to a phase shift corresponding to the subtraction of two phases originating from different receiver channels working at the same sampling frequency, it is also possible for a suitable distribution of the sampling frequencies to be such that any phase shift always originates from two phases measured with a same sampling frequency.

To that end, it suffices to build P sampling frequency pairs with indexes n·mod(P) and (n+1)·mod(P) for n ranging from 1 to P and to assign each of these P sampling frequency pairs to one of the P receiver channels. This amounts to assigning the sampling frequency pair with indexes p·mod(P) and (p+1)·mod(P) to the receiver channel with index p.

Figure 3:
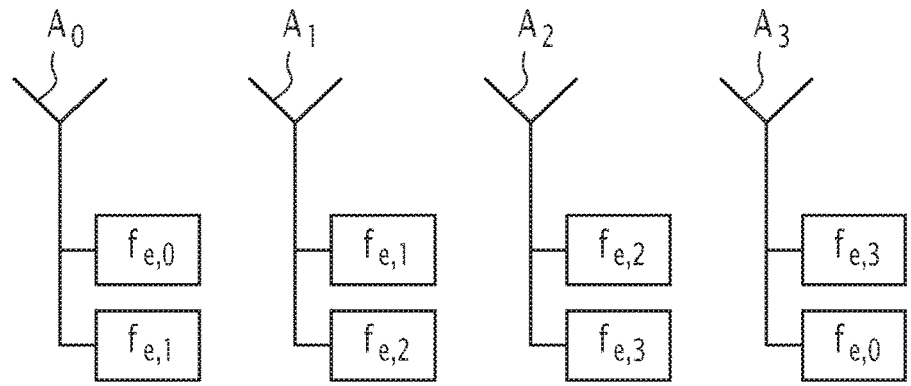
FIG. 3 is a schematic illustration of another exemplary interferometer.

FIG. 3 illustrates such a case for which the number of receiver channels P is equal to the number of sampling frequencies N, in the case at hand P=N=4.

Each receiver channel has only two analog-digital conversion modules.

The analog-digital conversion modules of the receiver channel indexed 0 are respectively associated with the sampling frequency indexed 0, $f_{e,0}$, and with the sampling frequency indexed 1, $f_{e,1}$. The analog-digital conversion modules of the receiver channel indexed 1 are respectively associated with the sampling frequency indexed 1, $f_{e,1}$, and with the sampling frequency indexed 2, $f_{e,2}$. The analog-digital conversion modules of the receiver channel indexed 2 are respectively associated with the sampling frequency indexed 2, $f_{e,2}$, and with the sampling frequency indexed 3, $f_{e,3}$. The analog-digital conversion modules of the receiver channel indexed 3 are respectively associated with the sampling frequency indexed 3, $f_{e,3}$, and with the sampling frequency indexed 0, $f_{e,0}$.

Thus, the phase shift between the antenna indexed 0 and the antenna indexed 1 is related to the sampling frequency indexed 1, $f_{e,1}$, the phase shift between the antenna indexed 1 and the antenna indexed 2 is related to the sampling frequency indexed 2, $f_{e,2}$, the phase shift between the antenna indexed 2 and the antenna indexed 3 is related to the sampling frequency indexed 3, $f_{e,3}$, and the phase shift between the antenna indexed 3 and the antenna indexed 0 is related to the sampling frequency indexed 0, $f_{e,0}$. As a result, there are four phase shifts each related to a same sampling frequency, three of which are still independent and based on three sampling frequencies out of the four. Thus, even if the frequency of the signal is equal or close to a multiple of a given sampling half-frequency, there is still a set of three independent phase shifts not related to this sampling frequency.

Figure 4:
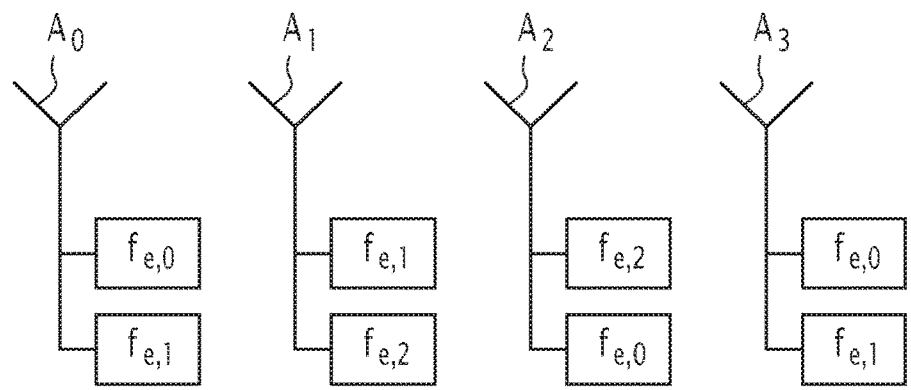
FIG. 4 is a schematic illustration of still another exemplary interferometer.

FIG. 4 illustrates a case where the number of receiver channels P is greater than the number of sampling frequencies N, in the case at hand P=4>N=3.

The analog-digital conversion modules of the receiver channel indexed 0 are respectively associated with the sampling frequency indexed 0, $f_{e,0}$, and with the sampling frequency indexed 1, $f_{e,1}$. The analog-digital conversion modules of the receiver channel indexed 1 are respectively associated with the sampling frequency indexed 1, $f_{e,1}$, and with the sampling frequency indexed 2, $f_{e,2}$. The analog-digital conversion modules of the receiver channel indexed 2 are respectively associated with the sampling frequency indexed 2, $f_{e,2}$, and with the sampling frequency indexed 0, $f_{e,3}$. The analog-digital conversion modules of the receiver channel indexed 3 are respectively associated with the sampling frequency indexed 0, $f_{e,0}$, and with the sampling frequency indexed 1, $f_{e,1}$.

That being said, the analog-digital conversion modules of the receiver channel indexed 3 could also respectively have been associated with the sampling frequency indexed 1, $f_{e,1}$, and with the sampling frequency indexed 2, $f_{e,2}$, or with the sampling frequency indexed 2, $f_{e,2}$, and with the sampling frequency indexed 0, $f_{e,0}$.

Figure 5:
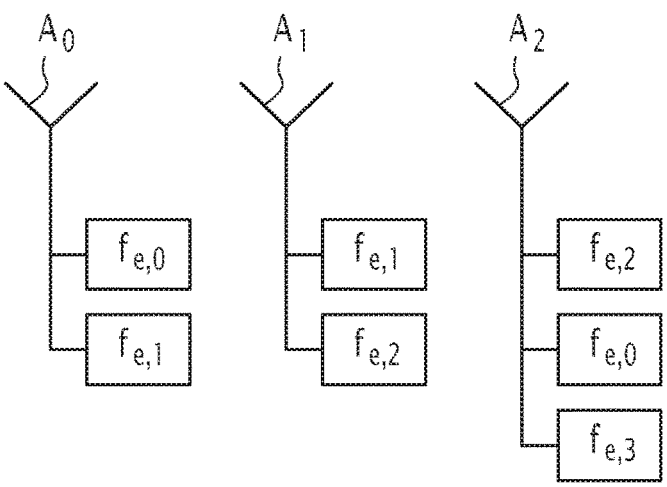
FIG. 5 is a schematic illustration of another exemplary interferometer.

FIG. 5 illustrates a case where the number of receiver channels P is less than the number of sampling frequencies N, in the case at hand P=3<N=4.

The receiver channels indexed 0 and 1 each include only two analog-digital conversion modules, while the receiver channel indexed 3 includes three analog-digital conversion modules.

The analog-digital conversion modules of the receiver channel indexed 0 are respectively associated with the sampling frequency indexed 0, $f_{e,0}$, and with the sampling frequency indexed 1, $f_{e,1}$. The analog-digital conversion modules of the receiver channel indexed 1 are respectively associated with the sampling frequency indexed 1, $f_{e,1}$, and with the sampling frequency indexed 2, $f_{e,2}$. The analog-digital conversion modules of the receiver channel indexed 2 are respectively associated with the sampling frequency indexed 2, $f_{e,2}$, with the sampling frequency indexed 0, $f_{e,0}$, and with the sampling frequency indexed 3, $f_{e,3}$.

In each of the cases where the number of receiver channels P is less than the number of sampling frequencies N, each pair of sampling frequencies with index p·mod(P) and (p+1)·mod(P) is associated with a pair of analog-digital conversion modules of a same receiver channel with index p. Additionally, the N–P sampling frequencies that are not part of a pair of sampling frequencies with indexes p·mod(P) and (p+1)·mod(P), for an index p varying between 0 and P–1, require adding N–P additional analog-digital conversion modules, each being associated with one of these N–P sampling frequencies, and these N P additional analog-digital conversion modules are distributed in any manner over the P receiver channels.

In general, a wideband interferometer with multiple under-sampling has been disclosed minimizing the number of digital receiver modules. Beyond the cost, mass, volume, consumption and reliability aspects directly related to this minimization, this also makes it possible to optimize the computing load of the processing module.

For the case of the amplitude goniometer, the setup is similar to that of FIG. 1, except that the antennas are angularly pointed in an offset manner from one another in the measuring plane of the angle of arrival of an incident signal, such that their directivity causes them to deliver a set of signals whose powers are representative of this angle of arrival.

In general, it is also necessary to have at least 2 different sampling frequencies per receiver channels in order to ensure at least one amplitude measurement and N sampling frequencies on Q adjacent receiver channels to eliminate the frequency ambiguities.

From the N sampling frequencies that are all different and not multiples of one another, J groups of sampling frequencies are built ($G_0, \ldots, G_{J-1}$), each group comprising at least 2 different sampling frequencies, the set of J groups comprising the set of N sampling frequencies such that J is minimal and at most equal to Q.

For example, let N=3 sampling frequencies $f_{e,0}$, $f_{e,1}$ and $f_{e,2}$, for Q≥2, two groups are obtained: $G_0=(f_{e,0}, f_{e,1})$ and $G_1=(f_{e,2}, f_{e,x})$ with x being able to be 0, 1 or 2.

For example, let N=4 sampling frequencies $f_{e,0}$, $f_{e,1}$, $f_{e,2}$ and $f_{e,3}$, for Q≥2, two groups are obtained: $G_0=(f_{e,0},f_{e,1})$ and $G_1=(f_{e,2}, f_{e,3})$.

For example, let N=5 sampling frequencies $f_{e,0}$, $f_{e,1}$, $f_{e,2}$, $f_{e,3}$ and $f_{e,4}$, for Q=2, two groups are obtained: $G_0=(f_{e,0}, f_{e,1})$ and $G_1=(f_{e,2},f_{e,3},f_{e,4})$; conversely, for Q≥3, three groups are obtained: $G_0=(f_{e,0},f_{e,1})$, $G_1=(f_{e,2}, f_{e,3})$ and $G_1=(f_{e,4}, f_{e,x})$ with x being able to be 0, 1, 2 or 3.

The analog-digital conversion modules of a receiver channel with index p are associated with the group of sampling frequencies of the sequence $G_{p \cdot mod(j)}$, for p ranging from 0 to P–1.

An instantaneous angular coverage of less than 360° creates P–Q+1 sets of Q adjacent receiver channels. The allocation of the groups of sampling frequencies to the receiver channels according to the previously defined rule ensures that it is possible to work with the N sampling frequencies at each of the P–Q+1 sets of Q adjacent receiver channels.

Conversely, an instantaneous angular coverage of 360° creates P sets of Q adjacent receiver channels for circular continuity reasons, the index 0 following the index P–1. In this case, the allocation of the groups of sampling frequencies to the receiver channels according to the previously defined rule does not ensure that it is possible to work with the N sampling frequencies at each of the P sets of Q adjacent receiver channels unless P is a multiple of J or unless Q is equal to P.

Indeed, in this case of an instantaneous angular coverage of 360°, the fact that P is not a multiple of J means that the rule for allocating the groups of sampling frequencies to the receiver channels, previously defined, does not affect all of the sets of Q adjacent receiver channels, comprising the receiver channels with indexes P–1 and 0, all of the defined groups of sampling frequencies ($G_0, \ldots, G_{J-1}$), unless Q is equal to P.

If Q is less than P, there are still sets of Q adjacent receiver channels, comprising the receiver channels with indexes P–1 and 0, that only have access to the groups of sampling frequencies $G_0$ to $G_{R-1}$, R being the remainder of the Euclidean division of P by J, they therefore do not have access to the groups of sampling frequencies $G_R$ to $G_{J-1}$.

As a result, in the case where the instantaneous angular coverage is equal to 360° and P is neither a multiple of J nor equal to Q, in addition to the rule previously defined that assigns, to the receiver channels with indexes P–1 and 0, respectively the groups of sampling frequencies $G_{R-1}$ and $G_0$, one simple optimal solution consists of assigning, to the set of these two receiver channels, the set of sampling frequencies from the groups $G_R$ to $G_{J-1}$ not belonging to the set of groups $G_{R-1}$ and $G_0$. This additional allocation of sampling frequencies can be done indifferently over the entire receiver channel with index 0, over the receiver channel with index P–1, or divided in any manner between these two receiver channels.

It must be noted that the angular precision, which goes hand-in-hand with large values of Q, of course requires that amplitude measurements be done for the antennas with extreme indexes of the range of Q indexes. Due to the directivity of the antennas, the gain of the antennas with extreme indexes from the range of the Q indexes on the incident signal is even smaller relative to that on the central antenna of this range when Q is large. This contributes to decreasing the overall sensitivity.

Figure 6:
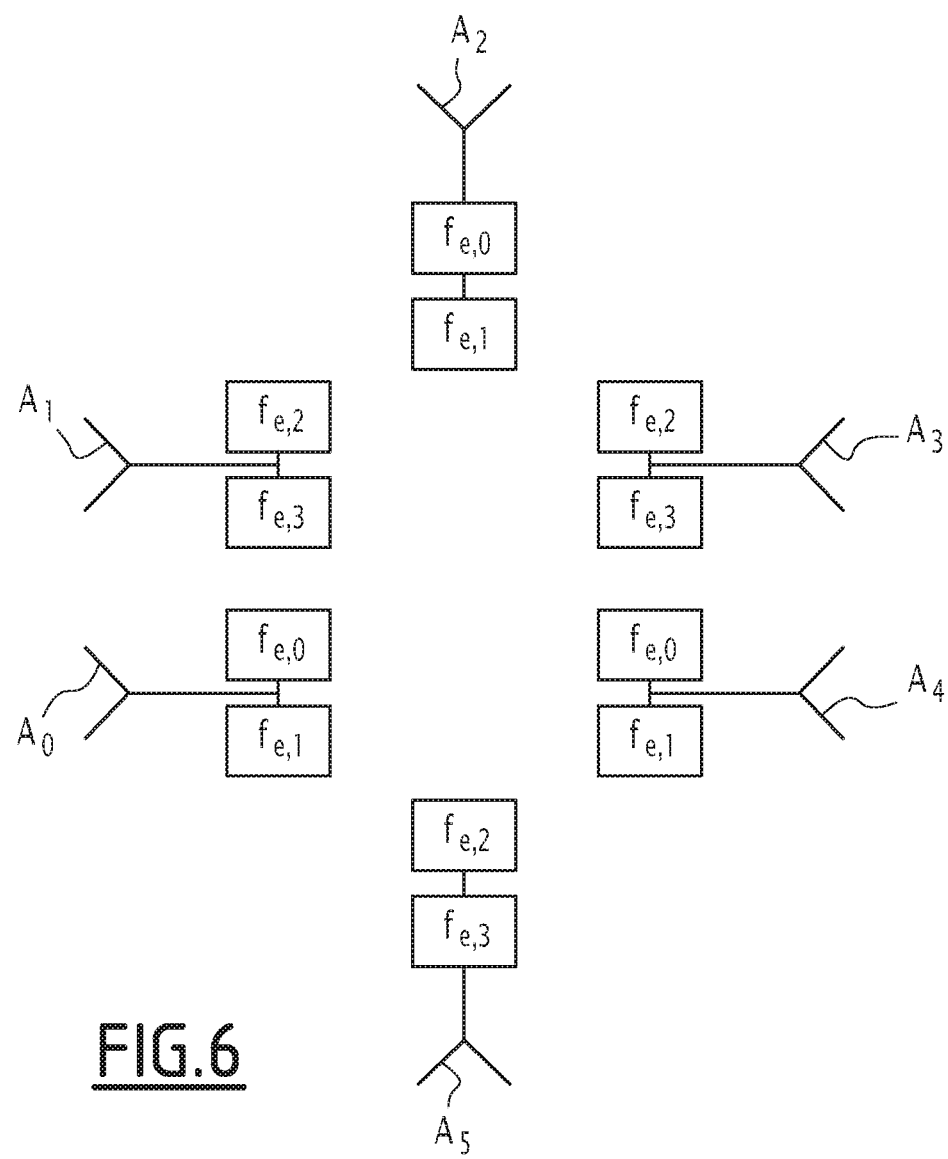
FIG. 6 is a schematic illustration of an exemplary amplitude goniometer.

FIG. 6 illustrates a case where the instantaneous angular coverage is 360° with N=4, P=6 and Q=2. N=4 and Q=2 such that J=2 and as a result P is a multiple of J.

There are two groups of sampling frequencies: $G_0$ comprising the sampling frequency indexed 0, $f_{e,0}$, and the sampling frequency indexed 1, $f_{e,1}$, and $G_1$ comprising the sampling frequency indexed 2, $f_{e,2}$, and the sampling frequency indexed 3, $f_{e,3}$.

The analog-digital conversion modules of the receiver channel indexed 0 are respectively associated with the sampling frequency indexed 0, $f_{e,0}$, and with the sampling frequency indexed 1, $f_{e,1}$. The analog-digital conversion modules of the receiver channel indexed 1 are respectively associated with the sampling frequency indexed 2, $f_{e,2}$, and with the sampling frequency indexed 3, $f_{e,3}$. The analog-digital conversion modules of the receiver channel indexed 2 are respectively associated with the sampling frequency indexed 0, $f_{e,0}$, and with the sampling frequency indexed 1, $f_{e,1}$. The analog-digital conversion modules of the receiver channel indexed 3 are respectively associated with the sampling frequency indexed 2, $f_{e,2}$, and with the sampling frequency indexed 3, $f_{e,3}$. The analog-digital conversion modules of the receiver channel indexed 4 are respectively associated with the sampling frequency indexed 0, $f_{e,0}$, and with the sampling frequency indexed 1, $f_{e,1}$. The analog-digital conversion modules of the receiver channel indexed 5 are respectively associated with the sampling frequency indexed 2, $f_{e,2}$, and with the sampling frequency indexed 3, $f_{e,3}$.

Figure 7:
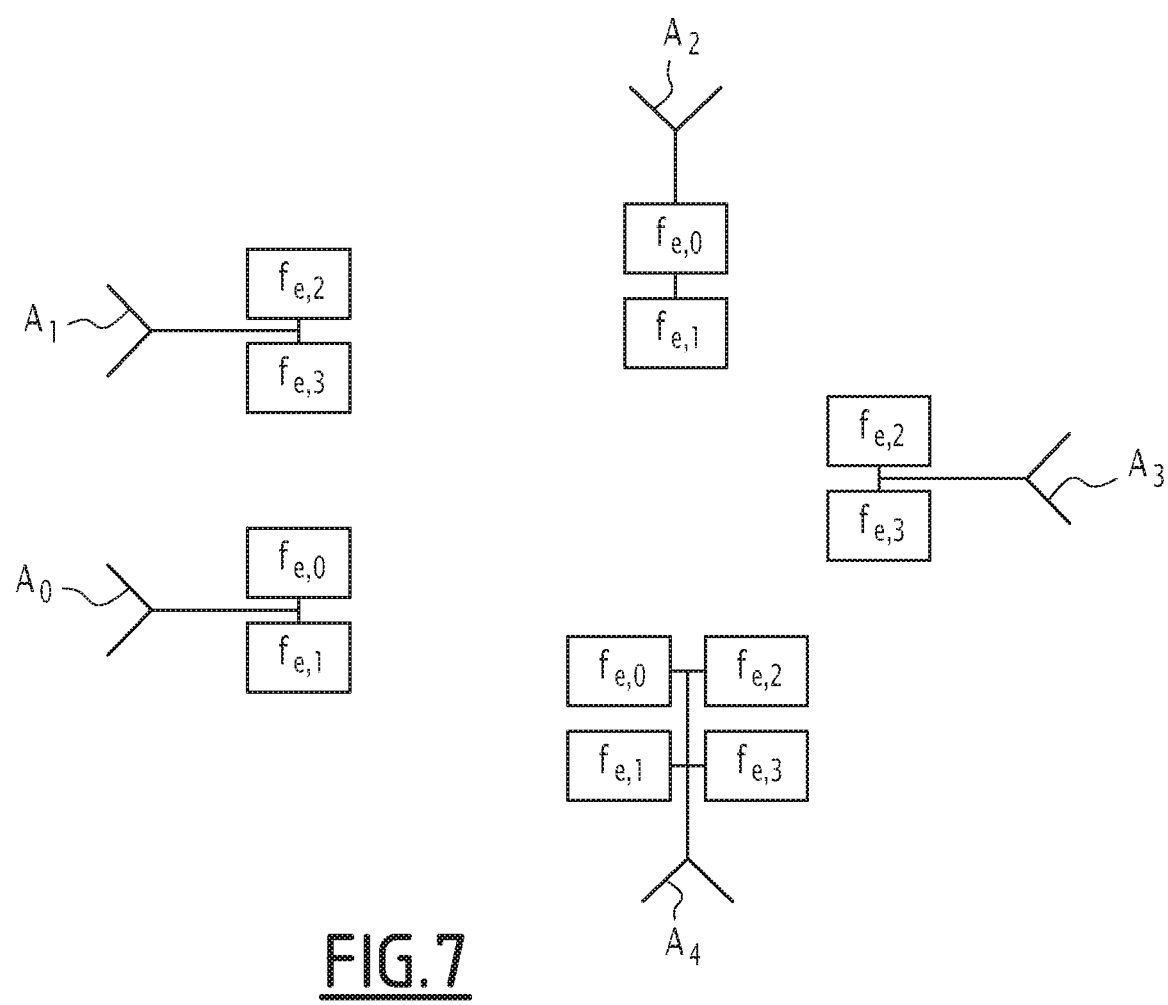
FIG. 7 is a schematic illustration of another exemplary amplitude goniometer.

FIG. 7 illustrates a case where the instantaneous angular coverage is 360° with N=4, P=5 and Q=2. N=4 and Q=2 such that J=2 and as a result P is not a multiple of J, and Q is less than P.

There are two groups of sampling frequencies: $G_0$ comprising the sampling frequency indexed 0, $f_{e,0}$, and the sampling frequency indexed 1, $f_{e,1}$, and $G_1$ comprising the sampling frequency indexed 2, $f_{e,2}$, and the sampling frequency indexed 3, $f_{e,3}$.

The analog-digital conversion modules of the receiver channel indexed 0 are respectively associated with the sampling frequency indexed 0, $f_{e,0}$, and with the sampling frequency indexed 1, $f_{e,1}$. The analog-digital conversion modules of the receiver channel indexed 1 are respectively associated with the sampling frequency indexed 2, $f_{e,2}$, and with the sampling frequency indexed 3, $f_{e,3}$. The analog-digital conversion modules of the receiver channel indexed 2 are respectively associated with the sampling frequency indexed 0, $f_{e,0}$, and with the sampling frequency indexed 1, $f_{e,1}$. The analog-digital conversion modules of the receiver channel indexed 3 are respectively associated with the sampling frequency indexed 2, $f_{e,2}$, and with the sampling frequency indexed 3, $f_{e,3}$. The receiver channel indexed 4 has four analog-digital conversion modules: two first modules respectively associated with the sampling frequency indexed 0, $f_{e,0}$, and with the sampling frequency indexed 1, $f_{e,1}$, and two second modules that are in fact complementary, respectively associated with the sampling frequency indexed 2, $f_{e,2}$, and with the sampling frequency indexed 3, $f_{e,3}$.

Figure 8:
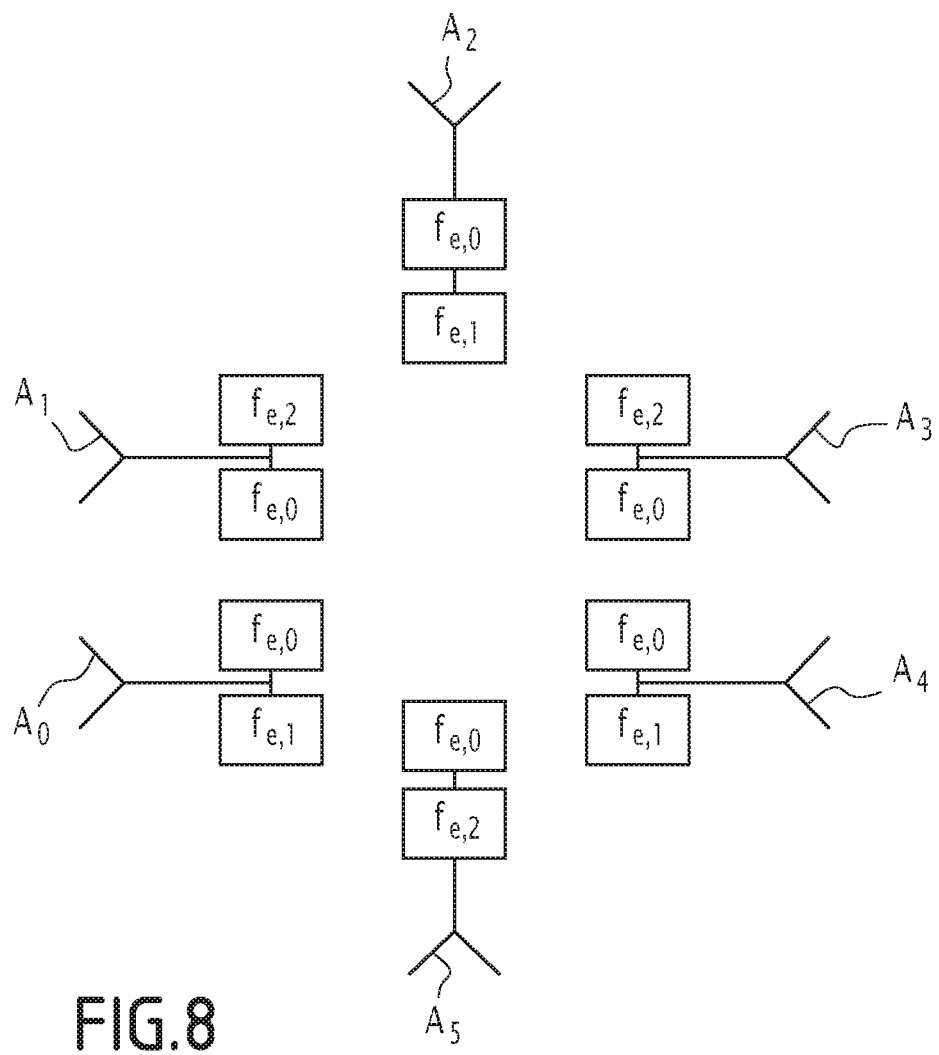
FIG. 8 is a schematic illustration of another exemplary amplitude goniometer.

FIG. 8 illustrates a case where the instantaneous angular coverage is 360° with N=3, P=6 and Q=2. N=3 and Q=2 such that J=2 and as a result P is a multiple of J.

There are two groups of sampling frequencies: $G_0$ comprising the sampling frequency indexed 0, $f_{e,0}$, and the sampling frequency indexed 1, $f_{e,1}$, and $G_1$ comprising the sampling frequency indexed 2, $f_{e,2}$, and any sampling frequency different from that indexed 2, $f_{e,2}$. For the figure, the chosen sample in frequency as that indexed 0, $f_{e,0}$, but this could have been that index 1, $f_{e,1}$. It must be noted that this option is valid for each receiver channel using $G_1$.

The analog-digital conversion modules of the receiver channel indexed 0 are respectively associated with the sampling frequency indexed 0, $f_{e,0}$, and with the sampling frequency indexed 1, $f_{e,1}$. The analog-digital conversion modules of the receiver channel indexed 1 are respectively associated with the sampling frequency indexed 2, $f_{e,2}$, and with the sampling frequency indexed 0, $f_{e,0}$. The analog-digital conversion modules of the receiver channel indexed 2 are respectively associated with the sampling frequency indexed 0, $f_{e,0}$, and with the sampling frequency indexed 1, $f_{e,1}$. The analog-digital conversion modules of the receiver channel indexed 3 are respectively associated with the sampling frequency indexed 2, $f_{e,2}$, and with the sampling frequency indexed 0, $f_{e,0}$. The analog-digital conversion modules of the receiver channel indexed 4 are respectively associated with the sampling frequency indexed 0, $f_{e,0}$, and with the sampling frequency indexed 1, $f_{e,1}$. The analog-digital conversion modules of the receiver channel indexed 5 are respectively associated with the sampling frequency indexed 2, $f_{e,2}$, and with the sampling frequency indexed 0, $f_{e,0}$.

It should be noted that in the case of an amplitude goniometer, the second element mentioned in the "Brief description of the invention" section is not taken into account. As explained in this section, the amplitude measurement error, due to the different filtering conditions of the signal for the DFTs done by the digital processing modules of the signal (26) when the sampling frequencies are different, is less critical than the phase measurement error for an interferometer. This error is also minimized by the weighting of the signal generally used, which broadens the bandwidth of the DFT filter. The residual error can be corrected if needed with precise knowledge of the frequency of the signal, which is always measured in a radar detector.

Lastly, the invention has been explained for 1D (one-dimensional) goniometers, that is to say, measuring a single angle, the angle in the plane where the antennas are arranged. It must be noted that the generalization to 2D (two-dimensional) goniometers, that is to say, measuring two angles, the angles located in two nonparallel planes, is done using the same basic principles.

The invention claimed is:

1. An amplitude goniometer comprising P receiver channels, P being an integer greater than or equal to 2, each receiver channel being identified by an index p corresponding to a given angular order, the index p being an integer between 0 and P−1, each receiver channel including an antenna coupled to a receiver chain, each receiver chain being followed by at least two digital receiver modules each comprising an analog-digital conversion module, each analog-digital conversion module being associated with a respective sampling frequency and having at an input a frequency band, each sampling frequency is such that half the sampling frequency is less than the frequency band, and each sampling frequency not complying with the Shannon theorem and not being a multiple of one of the other sampling frequencies, N being the number of sampling frequencies associated with the analog-digital conversion modules belonging to the P receiver channels, N being greater than or equal to 2, each sampling frequency being referenced by an index n, the index n being between 0 and N−1, an amplitude goniometry estimator working from amplitudes of the signals originating from at least Q adjacent receiver channels among the P receiver channels, Q being an integer at most equal to P, the sampling frequencies being associated with the analog-digital conversion modules of these Q adjacent receiver channels.

2. The amplitude goniometer according to claim 1, wherein the N sampling frequencies are divided into J sampling frequency groups named $G_0, \ldots, G_{J-1}$, each group comprising at least 2 different sampling frequencies, with J being an integer which is minimal and at most equal to Q.

3. The amplitude goniometer according to claim 2, wherein the analog-digital conversion modules of a receiver channel with index p are associated with the group of sampling frequencies $G_{p \cdot mod(J)}$, for p ranging from 0 to P−1.

4. The amplitude goniometer according to claim 3, wherein an angular coverage is less than 360°.

5. The amplitude goniometer according to claim 3, wherein an angular coverage is equal to 360° and the number of receiver channels P is greater than or equal to 3.

6. The amplitude goniometer according to claim 5, wherein the number of receiver channels P is a multiple of J or is equal to Q.

7. The amplitude goniometer according to claim 5, wherein the number of receiver channels P is not a multiple of J, or equal to Q, and wherein the sampling frequencies of the groups $G_R$ to $G_{J-1}$ are respectively associated with analog-digital conversion modules of complementary digital receiver modules, these complementary digital receiver modules being assigned in any manner to the set of two receiver channels $V_0$ and $V_{P-1}$, and R being the remainder of the Euclidean division of P by J.

8. The amplitude goniometer according to claim 1, wherein the minimum number of adjacent receiver channels required by the amplitude goniometry estimator is equal to 2.

9. The amplitude goniometer according to claim 1, including a computer able to process the signals coming from the digital receiver module.

10. The amplitude goniometer according to claim 1, wherein each analog-digital conversion system is connected to a digital processing module of the signal able to perform a spectral analysis of the sampled signals.

11. The amplitude goniometer according to claim 10, wherein the spectral analysis is done by discrete Fourier transform associated with a weighting of the sampled signals upstream.

12. A platform including an amplitude goniometer according to claim 1.

* * * * *